(12) United States Patent
Wolf-Monheim

(10) Patent No.: US 11,162,528 B2
(45) Date of Patent: Nov. 2, 2021

(54) CONTROL ARM WITH BALL-AND-SOCKET JOINT AND METHOD FOR MANUFACTURING SAME

(71) Applicant: Ford Global Technologies, LLC, Dearborn, MI (US)

(72) Inventor: Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 281 days.

(21) Appl. No.: 16/177,798

(22) Filed: Nov. 1, 2018

(65) Prior Publication Data

US 2019/0126704 A1    May 2, 2019

(30) Foreign Application Priority Data

Nov. 2, 2017   (DE) .......................... 102017219515.0

(51) Int. Cl.
*F16C 11/06* (2006.01)
*B60G 7/00* (2006.01)
*F16C 7/02* (2006.01)

(52) U.S. Cl.
CPC .......... *F16C 11/0685* (2013.01); *B60G 7/001* (2013.01); *B60G 7/005* (2013.01);
(Continued)

(58) Field of Classification Search
CPC .. B60G 7/001; B60G 7/005; B60G 2204/416; B60G 2204/80; B60G 2206/7101; B60G 2206/80; B60G 2206/81012; F16C 11/0604; F16C 11/0614; F16C 11/0633; F16C 11/0642; F16C 11/0657; F16C 11/0666; F16C 11/0676; F16C 11/068; F16C 11/0685; F16C 11/069; F16C 11/0695; F16C 11/08; F16C 33/125; F16C 2208/02; F16C 2326/05; Y10T 403/32196; Y10T 403/32204; Y10T 403/32311;
(Continued)

(56) References Cited

U.S. PATENT DOCUMENTS 2,556,767 A * 6/1951 McCann ................ B60G 7/005
                                                           280/124.139
2,960,348 A * 11/1960 Sarowski ............... B60G 7/005
                                                           280/124.134
(Continued)

FOREIGN PATENT DOCUMENTS

DE   102004048753 A1   4/2006
DE   102011108881 A1   7/2013
(Continued)

*Primary Examiner* — Josh Skroupa
(74) *Attorney, Agent, or Firm* — Raymond L. Coppiellie; Burgess Law Office, PLLC

(57) ABSTRACT

A control arm including a frame, a mounting structure on the frame, and a ball-and-socket joint on the frame. The ball-and-socket joint includes an insert formed of a resilient plastic material bonded in a complementary receptacle or socket of the frame. A ball portion of a ball-and-socket joint pin is rotatably arranged in the insert. A plastic material coating is provided on the ball portion and a metal coating is provided on the plastic material coating. When placed in the insert the metal coating of the ball portion contacts an inner surface of the insert.

5 Claims, 2 Drawing Sheets

(52) U.S. Cl.
CPC .......... *F16C 7/026* (2013.01); *F16C 11/0633* (2013.01); *F16C 11/0657* (2013.01); *F16C 11/0695* (2013.01); *B60G 2204/416* (2013.01); *B60G 2206/141* (2013.01); *B60G 2206/7101* (2013.01); *B60G 2206/81012* (2013.01); *F16C 2326/05* (2013.01)

(58) Field of Classification Search
CPC ..... Y10T 403/32631; Y10T 403/32636; Y10T 403/32713; Y10T 403/32729; Y10T 403/32737
USPC ...... 403/76, 77, 90, 122, 130, 132, 134, 135
See application file for complete search history.

(56) References Cited

U.S. PATENT DOCUMENTS

| | | | | |
|---|---|---|---|---|
| 3,231,299 | A * | 1/1966 | Birney | B60G 7/005 403/139 |
| 3,231,963 | A * | 2/1966 | Berar, Jr. | B60G 7/005 29/898.048 |
| 3,495,858 | A * | 2/1970 | Kindel | F16C 11/0633 403/140 |
| 4,324,501 | A * | 4/1982 | Herbenar | F16C 11/0638 403/135 |
| 4,722,631 | A * | 2/1988 | Tagami | F16C 11/0633 403/133 |
| 5,152,628 | A | 10/1992 | Broszat et al. | |
| 6,113,302 | A * | 9/2000 | Buhl | B60G 7/005 403/135 |
| 7,325,289 | B2 * | 2/2008 | Budde | F16C 11/0633 29/458 |
| 8,979,376 | B2 * | 3/2015 | Angenheister | F16C 11/0633 384/276 |
| 9,695,869 | B2 * | 7/2017 | Blachon | F16C 11/0609 |
| 10,247,228 | B2 * | 4/2019 | Yu | F16C 11/0633 |
| 10,350,951 | B2 * | 7/2019 | Meyer | B60G 7/001 |
| 2005/0063769 | A1 | 3/2005 | Holmes | |
| 2012/0141192 | A1 | 6/2012 | Kwon | |
| 2020/0223273 | A1 * | 7/2020 | Kwon | B60G 7/005 |

FOREIGN PATENT DOCUMENTS

| | | | | |
|---|---|---|---|---|
| GB | 2103532 | A * | 2/1983 | ............ F16C 11/068 |
| KR | 101549918 | B1 | 9/2015 | |

* cited by examiner

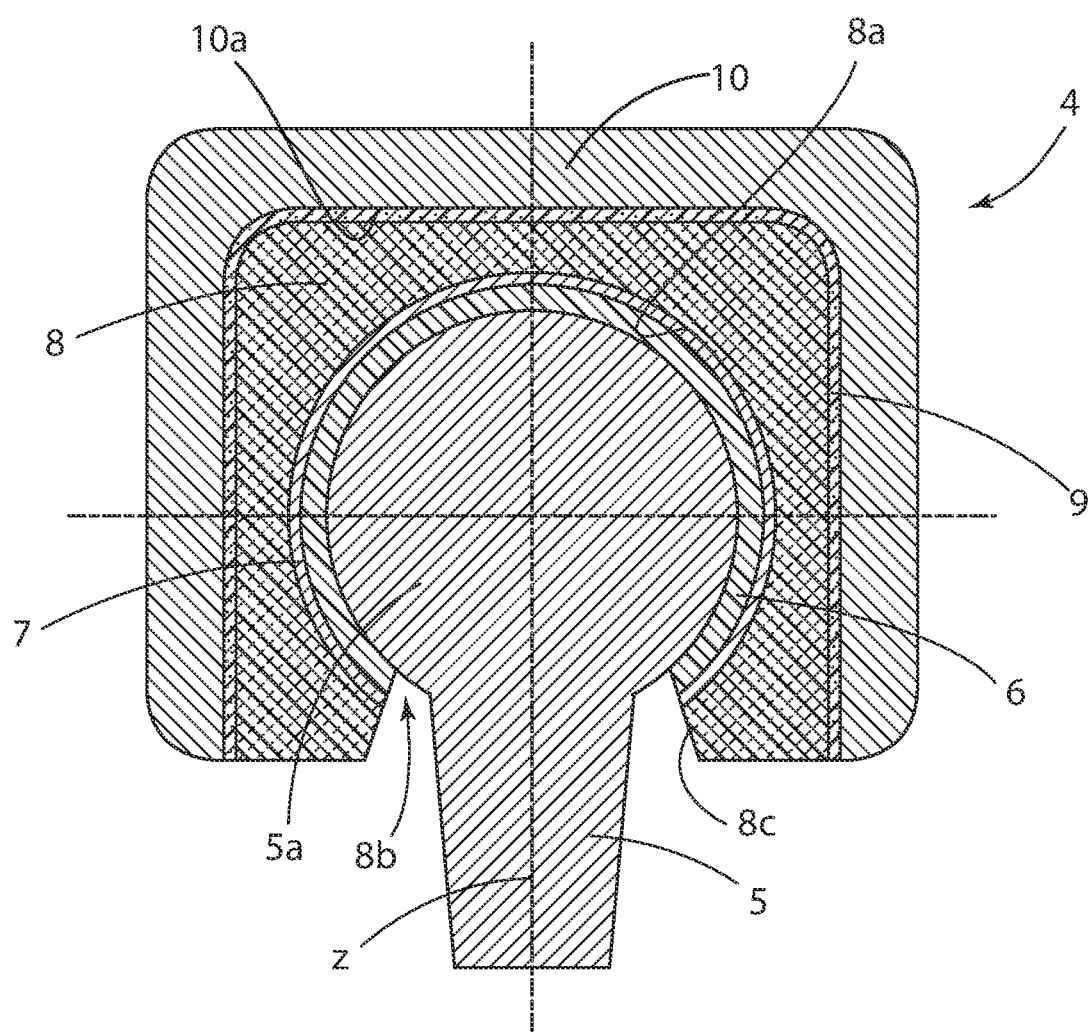

CONTROL ARM WITH BALL-AND-SOCKET JOINT AND METHOD FOR MANUFACTURING SAME

CROSS-REFERENCE TO RELATED APPLICATIONS

Not Applicable.

BACKGROUND OF THE INVENTION

1. Field of the Invention

The invention relates to a control arm; and more specifically, to a control arm having a ball-and-socket joint and a method for manufacturing same.

2. Description of Related Art

A vehicle suspension system supports and suspends a vehicle frame in movable manner at a predetermined height providing vehicle stability over different roadway surfaces. The vehicle suspension system may include, as a component thereof, a control arm. The control arm connects the vehicle frame to a wheel carrier of the vehicle. The control arm is exposed to dynamic loads and should be sufficiently rigid and strong to withstand such loads. Control arms should be both robust and light and can be constructed from metal or composite materials.

A control arm may have a substantially triangular frame having a mounting structure on the frame for connecting the control arm to the vehicle body or frame. The mounting structure including projections or bosses, each typically having an opening or through bore receiving a bushing. The projections axially oriented on a common, first axis. A ball-and-socket joint is provided on the frame on a second axis which intersects the first axis.

SUMMARY OF THE INVENTION

A control arm including a frame. A ball-and-socket joint including a resilient plastic insert is bonded in a complementary receptacle in the frame. The ball-and-socket joint including a ball portion of a ball-and-socket joint pin rotatably arranged in the insert with a plastic coating on the ball portion. A metal layer contacts the plastic coating and an inner surface of the insert.

Further areas of applicability of the present invention will become apparent from the detailed description provided. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a sectional view along a section plane A-A in FIG. 1 of the control arm according to the exemplary embodiment of the present invention.

DETAILED DESCRIPTION OF THE PREFERRED EMBODIMENTS

Figure 1:
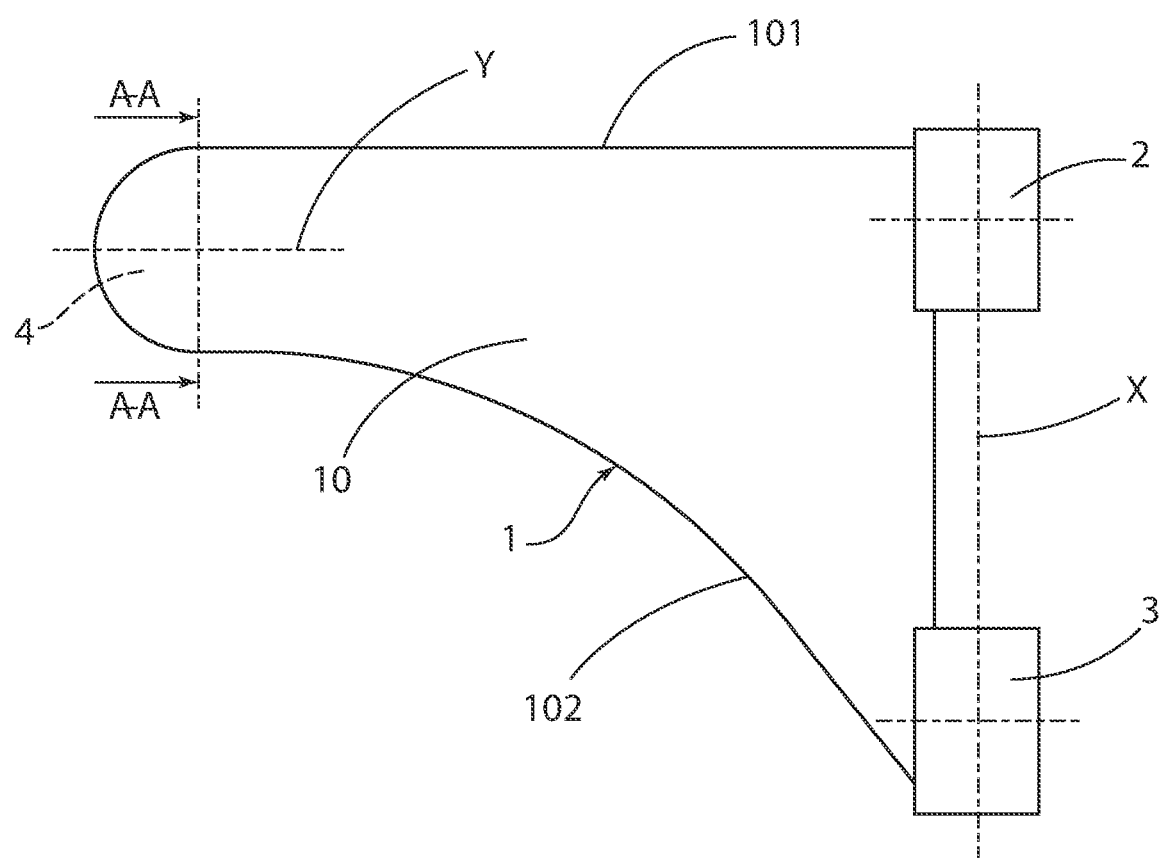
FIG. 1 is a plan view of a control arm according to an exemplary embodiment of the present invention.

The following description of the preferred embodiment(s) is merely exemplary in nature and is in no way intended to limit the invention, its application, or uses.

Identical parts are identified in the various figures with the same reference numerals, and therefor as a rule described only once. The features and measures listed individually in the following description may be combined in any desired, technically expedient manner and disclose further configurations of the invention. The description characterizes and explains the invention in particular in connection with the figures.

FIG. 1 shows a plan view of a control arm 1 according to an exemplary embodiment of the present invention. FIG. 2 shows a sectional view along a section plane A-A of FIG. 1.

The control arm 1 has a frame 10, and a mounting structure, shown in the illustrated example as two projections or bosses 2, 3. The projections 2, 3 are shown connected to the frame 10 and oriented on a common, first axis X. The control arm 1 also having a ball-and-socket joint 4, see FIG. 2, secured to the frame 10 of the control arm 1 on a second axis Y, which intersects the first axis X.

The control arm 1 forming a part of a vehicle suspension and connecting a vehicle frame to a wheel carrier of the vehicle. The two projections 2, 3 connecting one side or end of the control arm 1 to the vehicle frame with the ball-and-socket joint 4 connecting the opposite side or end of the control arm 1 to the wheel carrier.

In one example, a fiber-reinforced plastics material forms the frame 10, making the frame 10 lower in weight than conventional frames constructed from a metal sheet. The frame 10 has a substantially triangular shape with the projections 2, 3 and the ball-and-socket joint 4 at the corners or opposite sides. The frame 10 has a first edge 101 and a second edge 102. When the control arm 1 is installed in the vehicle, the first edge 101 may face towards a front of the vehicle and the second edge 102 towards a rear of the vehicle. The first edge 101 is substantially straight, perpendicular to the first axis X, and parallel to the second axis Y. The second edge 102 is substantially arcuate. In the region of the ball-and-socket joint 4, the second edge 102 extends substantially parallel to the second axis Y and, as it extends inwards, towards the projections 2, 3 converges towards the first axis X.

In one example, the two projections 2, 3 include openings or through bores for accommodating rubber bushings (not shown). The mounting structure can be of one-piece construction and provide the possibility of accommodating two rubber bushes or similar bearings. The rubber bushes can be adhesively bonded or inserted in apertures in the mounting structure or they can be cast with the bush mountings. As shown, the two projections 2, 3 are axially oriented in the first axis X, wherein the control arm 1 mounted to the vehicle frame at the two projections 2, 3 pivots or rotates about the first axis X.

The ball-and-socket joint 4 includes an insert 8, formed of a resilient plastic material adhesively bonded into a complementary receptacle 10a—socket or through bore—of the frame 10. In one example, the insert 8 is formed from a fiber-reinforced plastic material, contributing to a reduction in weight. The insert 8 may be formed of a plastic material having a low coefficient of friction, for example, a material containing polytetrafluoroethylene (PTFE).

Like the frame 10, the fiber-reinforced plastic material of the insert 8 can be formed from a carbon fiber-reinforced plastic material.

A ball portion 5a of a ball-and-socket joint pin 5 is rotatably arranged in the insert 8. As illustrated, the ball-and-socket joint pin 5 extends along a third axis Z, perpendicular to the first axis X and the second axis Y. The ball-and-socket joint pin 5 rotatable about all three spatial axes X, Y and Z.

The ball portion 5a includes a plastic material coating 6. A metal coating 7 is provided on the plastic material coating 6, with the metal coating 7 contacting an inner surface 8a of an opening or ball socket 8b of the insert 8. The inner surface 8a of the opening or ball socket 8b has an inner surface 8a preferably of a spherical shape and complementary to a spherical shape of the ball portion 5a. The metal coating 7 and plastic material coating 6 provide a smooth low friction surface, good durability, and a sufficiently tight tolerance in the ball-and-socket joint 4.

One example of a method for manufacturing the control arm 1 includes coating the ball portion 5a of the ball-and-socket joint pin 5, for example by injection molding encapsulation, with the plastic material coating 6. Next the plastic material coating 6 is coated with the metal coating 7. The metal coating 7 applied, for example, by a vapor deposition process such as thermal vapor deposition or through a Physical vapor deposition (PVD) process. Once the coatings 6, 7 on the ball portion 5a have hardened, the ball portion 5a coated with the plastic material coating 6 and the metal coating 7 is positioned in the insert 8. As illustrated, the metal coating 7 contacts the inner surface 8a of the insert 8. The ball portion 5a inserted in the direction of the third or Z axis into the insert 8. Preferably through the chamfered opening 8c in bottom of the insert 8. The opening 8c preferably has a diameter smaller than the ball portion 5a. In the disclosed example, the plastic material of the insert 8 has a suitable resilience and the opening thereof temporarily widens when inserting the ball portion 5a. During insertion the ball portions 5a engages the chamfered opening 8c moving the surfaces of the chamfered opening 8c outward, away from the Z axis, and increasing the size of the opening 8c. To help with outward deflection and correspondingly increase the opening size, slots (not shown) can be provided in the insert 8. The slots recessed in the direction of the third axis Z from the bottom upwards in FIG. 2. Materials particularly suitable for the insert 8 include a fiber-reinforced plastic that combines good deformability on the one hand with sufficient rigidity on the other.

After placing the ball portion 5a in its final position within the insert 8, the insert 8—the chamfered opening 8c substantially returns to its original shape. Construction of the ball-and-socket joint 4 of the control arm 1 includes bonding the prepared insert 8 into the complementary receptacle 10a of the frame 10. FIG. 2 shows the frame 10 of the control arm 1 having the socket or receptacle 10a for receiving the insert 8. FIG. 2 denotes an adhesive layer or bonding agent 9 between the insert 8 and the complementary receptacle 10a of the frame 10. The adhesive layer 9 may be applied directly to the insert 8, in the complementary receptacle 10a of the frame 10, or it may be applied by immersing the insert 8 into an adhesive. Adhesively bonding the insert 8 to the complementary receptacle 10a of the frame 10 reduces manufacturing costs in comparison with conventional control arms.

Adhesive bonding of the prefabricated assembly, the insert 8 and the ball-and-socket joint pin 5, in or to the complementary receptacle 10a of the relatively rigid frame 10 results in a robust mounting of the ball-and-socket joint pin 5. Such robust mounting is achieved by using plastic for the frame 10 and the insert 8 which also achieves additional weight saving. With exception of the metal coating 7, it is possible to dispense with metallic materials.

The control arm and method of making it results in a reduction of manufacturing costs compared to conventional control arms. The design is simplified, reducing weight by largely dispensing with metal components besides the metal coating 7. The exemplary embodiment provides a rigid and strong connection with great durability between the ball-and-socket joint pin 5 and the frame 10.

As disclosed, the control arm 1 includes a frame 10, a mounting structure, for example, a protrusion or boss 2, 3 on the frame 10, and a ball-and-socket joint 4 on the frame 10. The ball-and-socket joint 4 including an insert 8 of a resilient plastic material, which is adhesively bonded in or to a complementary receptacle 10a in the frame 10. A ball portion 5a of a ball-and-socket joint pin 5 is rotatably arranged in the insert 8. The ball portion 5a including a plastic material coating 6 and a metal coating 7. The metal coating 7 contacting the inner surface 8a of the insert 8. The metal coating 7 and plastic material coating 6 ensures low friction and sufficient tolerance in the ball-and-socket joint 4.

The weight of the control arm 10 reduced by the insert 8 formed, not of metal, but of a resilient plastic material. The exemplary insert 8 enables simplified manufacture, while simultaneously retaining a sufficiently rigid and strong connection between a ball-and-socket joint pin 5 and a control arm frame 10 of the vehicle.

The frame 10 is preferably constructed from a fiber composite material; i.e., a fiber-reinforced plastics material, achieving a further reduction in weight. The insert 8 is preferably constructed from a fiber composite material; i.e., a fiber-reinforced plastics material, achieving a further reduction in weight. Suitable fiber composite materials include materials, in which fibers, such as glass fibers, carbon fibers and/or aramid fibers, are embedded for reinforcement in a polymer matrix; for example, a matrix of plastic material or synthetic resin. Further particles, layers, or components not classified as polymers or fibers may be optionally incorporated or attached.

The protrusion 2, 3 is, in one example, a bush mounting for accommodating a rubber bushing that can advantageously be integrated during shaping of the frame 10.

Preferably, protrusions 2, 3 are provided that are axially oriented on a common, first axis. The ball-and-socket joint 4 being on a second axis intersecting the first axis thereby raising robustness of the frame and control arm as a whole.

As disclosed, the exemplary embodiment includes a method for manufacturing the control arm 1. The control arm 1 includes a frame 10, at least one protrusion 2, 3 on the frame 10, and a ball-and-socket joint 4 secured to the frame. The method includes coating a ball portion 5a of a ball-and-socket joint pin 5 with a plastic material coating 6, coating the plastic material coating 6 with a metal coating 7, and placing the ball portion 5a coated with the plastic material coating 6 and the metal coating 7 into an insert 8 constructed from a resilient plastic material with the metal coating 7 contacting an inner surface 8a of the insert 8, and using an adhesive or bonding agent 9 to secure the insert 8 in a complementary receptacle 10a of the frame 10 to form the ball-and-socket joint 4 of the control arm 1. In one embodiment both the frame 10 and insert 8 are constructed from a fiber-reinforced plastic material, achieving a further reduction in weight The metal coating 7 is, in one embodiment, applied by a vapor deposition process, achieving a precise layer thickness with tight tolerances. The plastic material coating 6 is, in one embodiment, formed by injection molding encapsulation of the ball portion 5a, so the plastic material coating maintains accurate tolerances. For example, using precision tools during the injection molding process.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for manufacturing a control arm comprising:
providing a frame having a mounting structure and a receptacle for receiving a ball-and-socket joint;
coating a ball portion of a ball-and-socket joint pin with a plastic coating;
coating the plastic coating with a metal coating;
providing an insert formed of a resilient plastic, the insert having a ball socket and a chamfered opening communicating with the ball socket, said chamfered opening having a diameter less than a diameter of the ball portion;
placing the ball portion in the chamfered opening and inserting the ball portion into the ball socket wherein upon insertion the metal coating contacts an inner surface of the insert;
during insertion the ball portion engages and moves surfaces of the chamfered opening outward increasing the diameter of the chamfered opening; and
bonding the insert in said receptacle after the ball portion is inserted into the ball socket.

2. The method of claim 1 including constructing the frame from a fiber-reinforced plastic.

3. The method of claim 1 including constructing the insert from a fiber-reinforced plastic.

4. The method of claim 1 including applying the metal coating to the plastic coating on the ball portion with a vapor deposition process.

5. The method of claim 1 including applying the plastic coating on the ball portion by injection molding encapsulation of the ball portion.

\* \* \* \* \*